Patented Aug. 22, 1950

2,519,565

UNITED STATES PATENT OFFICE 2,519,565

GERMICIDAL COMPOSITION COMPRISING FORMALDEHYDE AND BIS(2-HYDROXY-3,5,6-TRICHLOROPHENYL) METHANE

Horace James Hallowell, Ridgefield, Conn., assignor to Bard-Parker Company, Inc., Danbury, Conn., a corporation of New York No Drawing. Application November 6, 1945, Serial No. 627,093

3 Claims. (Cl. 167—26)

The invention pertains to a composition of matter having germicidal properties. More particularly, it relates to a germicidal composition for the sterilization of surgical instruments, and includes correlated improvements and discoveries whereby the properties of such a composition are enhanced.

An object of the invention is the provision of a composition of matter having high germicidal value and which is of distinctive effectiveness at room temperatures thus avoiding deleterious effects of heat sterilization upon metal instruments.

Another object of the invention is to provide a germicidal composition possessing marked activity without corrosive action upon metal objects with which it may come in contact and which is relatively non-toxic on contact and relatively non-injurious to the hands and to organic materials, such as rubber gloves, catheters and sheeting, cotton, silk and other fabrics and materials commonly used by surgeons and in the hospitals.

A further object of the invention is the provision of a liquid germicidal composition containing an aldehyde, a volatility accelerator and a corrosion inhibitor for the non-corrosive sterilization of metallic objects, and having a germicidal value which is several times that of formaldehyde compositions previously utilized.

An additional object of the invention is to provide a germicidal composition which is effective in vapor or in liquid phase, either or both, which may be readily and economically manufactured commercially, and which may be stored for prolonged periods without loss of activity.

A specific object of the invention is to provide a germicidal composition in liquid form containing a compound of germicidal activity, a synergist, a compound which increases the volatility, i. e., a volatility accelerator, a compound that inhibits corrosion of metals, and an alkalizing agent.

Other objects of the invention will in part be obvious and will in part appear hereinafter.

The invention accordingly comprises a composition of matter possessing the characteristics, properties and the relation of constituents which will be exemplified in the composition here'nafter described and the scope of the invention will be indicated in the claims.

In the practice of the invention a composition having germicidal activity may be produced by combining, preferably in liquid form, which may be as a solution of the various components, formaldehyde usually in the form of a solution containing a greater or lesser amount of water, a compound having the property of increasing the volatility of the finished composition and which more especially may be an organic liquid of relatively low boiling point, a synergistic agent, and a compound, organic or inorganic, which prevents or inhibits in large measure the corrosion of metals with which the composition may come in contact.

There may be included also a substance which renders the composition slightly alkaline or neutral, as may be desired. The composition suitably is in liquid condition, and is so utilized for the sterilization of objects or materials, more particularly for the sterilization of surgical instruments. For such purpose the germicide is markedly efficacious in that it not only kills bacteria, including spore bacteria, but it is without dulling action upon the instruments which may be placed therein. Moreover, the balancing of the various components is such that when a steril'zed object is removed therefrom the composition evaporates readily and without leaving any substantial deposit upon the surfaces. Inasmuch as the composition is non-corrosive and non-dulling, surgical instruments may be placed therein and permitted to remain for extended periods of time without any noticeable disadvantageous effect. Furthermore, the composition possesses distinctive germicidal value at room temperatures, and does not require heating to accomplish a sterilization. This property is of marked s'gnificance since necessity for a heating medium is obviated as are certain disadvantages which attend the raising of keen edged and carefully balanced surgical instruments to relatively high temperatures.

The compound availed of for germ'cidal action is formaldehyde, and especially in the usual form, namely, as U. S. P. formaldehyde.

As a means for increasing the volatility of the liquid composition there may be used a saturated aliphatic alcohol suitably having not more than three carbon atoms, namely methyl, ethyl, propyl and isopropyl alcohols. These alcohols may be employed alone or in compatible adm'xture, and preferably the composition contains an amount of methyl alcohol. The activity of the germicide, specifically formaldehyde, is distinctly enhanced by including in the composition bis(2-hydroxy-3,5,6-trichlorophenyl) methane as a synerg'st.

The hydroxy-chlorophenyl compound is utilized preferably in the form of its alkali metal salts, more especially the sodium salt. Further, it is advantageous to include a surface active agent, e. g. 3,9 diethyltridecanol sodium sulphate; ethanolamine derivatives of decanols such as triethanolamine derivative of 7-ethyl-2-methyl undecanol; sodium alkyl sulfates e. g.

$C_4H_9CH(C_2H_5)CH_2SO_4Na$ ethyl phenyl phenol alkali metal salts of sulfonated acids; esters of ricinoleic acid, and partial fatty acid esters of sorbitol and mannitol and inner ethers thereof. The synergistic agent may be introduced in chemically compatible quantity with ranges from 0.1% to 2.0% by weight having been found effective. This may be, e. g. about 0.5% as the base and about 0.59% in the form of a sodium salt. The surface active agent may be introduced also in chemically compatible quantity ranging from 0.01% to 2.5% by weight.

The penetration of the lethal agent may be further enhanced by increasing the water content of the solution as a means of reducing the coagulative effect of the lethal agent and its alcoholic vehicle upon the proteinagenous composition of the bacteria and their spores and any surrounding blood or other organic matter in which they may be contained.

As a corrosion inhibitor, use may be made of an inorganic salt containing a reducing anion, or of an aliphatic derivative of nitrous acid. The inorganic salt may be of ammonium; of an alkali metal, e. g., sodium, potassium, lithium, cesium and rubidium; of an alkali earth metal, as calcium, barium and strontium, or of magnesium, and as reducing anions mention may be made of a nitrite, thiosulfate, hypophosphite, hydrosulfite, sulfite and an aliphatic ester of gallic acid e. g. the methyl, ethyl, propyl, butyl, and amyl esters. Such a compound may be present in the composition in a small amount, usually not greater than 0.2%, and satisfactory results have been obtained when using smaller amounts, such as 0.01% nitrite content.

A composition which is neutral, or slightly alkaline, is preferred when metallic objects are to be sterilized, since thereby corrosive action is further decreased. This condition may be brought about by the inclusion of a small amount of an alkalizing agent, which may be sodium or potassium hydroxide, or a compound which gives rise to these hydroxides as a result of hydrolysis. Further, the alkalizing of the solution may result from the hydrolysis of the compound which is introduced to inhibit corrosion of metals.

Sterilization of objects may be brought about by the germicidal composition, either in liquid or in vapor phase. The presence of some water is desirable since it is believed that the activity of formaldehyde is thereby increased. Moreover, the volatility of the composition, may be such as to facilitate the formation of vapors from the liquid so that when it is placed in a covered receptacle the enclosed vapors are sufficient to sterilize objects in the receptacle even though not fully immersed in the composition. When the germicidal composition is to be employed for sterilizing in the vapor phase, the corrosion inhibitor should be a compound which is of comparatively ready volatility, and such suitably may be an aliphatic nitrite, e. g., the methyl, ethyl, propyl, butyl, and amyl nitrites. These organic nitrites volatilize readily; pass into the vapor phase along with the germicide, as formaldehyde; and thus inhibit corrosion of the metallic objects undergoing sterilization.

As an illustrative embodiment of a manner in which the invention may be practiced, the following examples are presented. The percentages are by weight.

*Example I*

| | Per cent |
|---|---|
| Isopropanol | 48.00 |
| Methanol | 3.00 |
| Formaldehyde (absolute) | 8.00 |
| 2.2′ dihydroxy.3.5.6.3′.5′.6′ hexachloro-diphenyl methane, sodium salt | .59 |
| Sodium hydroxide | .025 |
| Sodium nitrite | .135 |
| Water by difference | 40.25 |

*Example II*

A formaldehyde composition may be prepared as in Example I with the inclusion of 0.1% of calcium nitrite instead of sodium nitrite, and of 0.03% potassium hydroxide in place of sodium hydroxide.

*Example III*

A formaldehyde composition as in Example I may be prepared which contains propyl gallate in an amount of 0.05% to 0.1% instead of sodium nitrite.

*Example IV*

A formaldehyde composition as in Example I may be adapted for use in vapor phase by utilizing ethyl nitrite in an amount of about 0.15% in place of sodium nitrite.

It is to be understood that ethanol and other aliphatic alcohols may be used in place of or in conjunction with isopropanol. Further, the proportion of water to alcohol may be varied in amounts compatible with non-corrosion of metallic instruments.

It has been found by bacteriological determination that the introduction of the synergistic agent markedly increases the efficiency of the solution with the killing time for all microorganisms, including the most resistant tetanus spores being decidedly reduced, and in fact to about the same time as boiling. Further, the solution has little drying and irritating effect on the hands and skin.

The compositions illustrated by the foregoing examples are characterized by high germicidal activity, and they possess the property of being several times more effective in killing bacteria than formaldehyde compositions previously produced for the non-corrosive sterilization of metallic or inanimate objects. Moreover, the compositions contain an amount of the germicide to give an effective sterilization; of a synergistic agent to augment and of water to accelerate the germicidal effect; of an alcohol to bring about rapid evaporation, with accompanying fumigation in vapor phase in closed containers; of a corrosion inhibitor containing a reducing anion to protect metallic objects which it touches; of an alkalizing agent to bring the composition to neutral, or slightly alkaline condition, and of the various solid constituents so that there will not be an undue deposition upon metallic objects, especially surgical instruments.

Moreover, the germicidal composition efficiently kills bacteria including spore bacteria, not only when objects to which they are attached are immersed in the composition, but also when such objects are in contact with the vapors in a closed container. Consequently, surgical instruments will be fully sterilized even though they are not completely immersed, since those parts projecting from the liquid will undergo sterilization through contact with the vapors. Furthermore, and this is to be especially noted, these vapors also sterilize the interior portion of the container above the level of the solution therein, so that sterile instruments, when removed from the solution, may not be re-contaminated by accidental contact with the interior walls or rim of the sterilizer. The composition is without harm to instruments sterilized thereby; is sufficiently volatile to evaporate rapidly when objects are removed therefrom; does not deposit substantial quantities of solid materials upon the objects, and such quantities as do deposit are without toxic effect. Heating or other particular treatment is not required either in production or in use, and undesirable odors, as that of formaldehyde, are not present to an undesirable extent.

Since certain changes may be made in the above composition of matter and different embodiments of the invention could be made without departing from its scope, it is intended that all matter contained in the above description shall be interpreted as illustrative and not in a limiting sense.

Having described my invention, what I claim as new and desire to secure by Letters Patent is:

1. A composition of matter comprising formaldehyde, a lower aliphatic alcohol, and bis-(2-hydroxy-3,5,6-trichlorophenyl) methane.

2. A composition of matter comprising formaldehyde, isopropyl alcohol, bis-(2-hydroxy-3,5,6-trichlorophenyl) methane, and 3,9 diethyltridecanol sodium sulfate.

3. A composition of matter comprising formaldehyde, a lower aliphatic alcohol and a sodium salt of bis (2-hydroxy-3,5,6-trichlorophenyl) methane.

HORACE JAMES HALLOWELL.

REFERENCES CITED

The following references are of record in the file of this patent:

UNITED STATES PATENTS

| Number | Name | Date |
|---|---|---|
| 1,154,925 | Horovitz | Sept. 28, 1915 |
| 1,983,031 | Himebaugh | Dec. 4, 1934 |
| 2,250,480 | Gump | July 29, 1941 |
| 2,304,950 | Parker et al. | Dec. 15, 1942 |
| 2,347,012 | Waugh | Apr. 18, 1944 |

FOREIGN PATENTS

| Number | Country | Date |
|---|---|---|
| 510,519 | Great Britain | July 31, 1939 |

OTHER REFERENCES

"The Value of a New Compound Used in Soap to Reduce the Bacterial Flora of the Human Skin," by Traub, Newhall and Fuller in Surgery, Gynecology and Obstetrics for Aug. 1944, vol. 79, pages 205, 206.

Cade, Chemical Abstracts, vol. 1944, page 6489.